P. EVANCHO.
PNEUMATIC TIRE PROTECTOR.
APPLICATION FILED DEC. 16, 1920.
1,383,612.
Patented July 5, 1921.
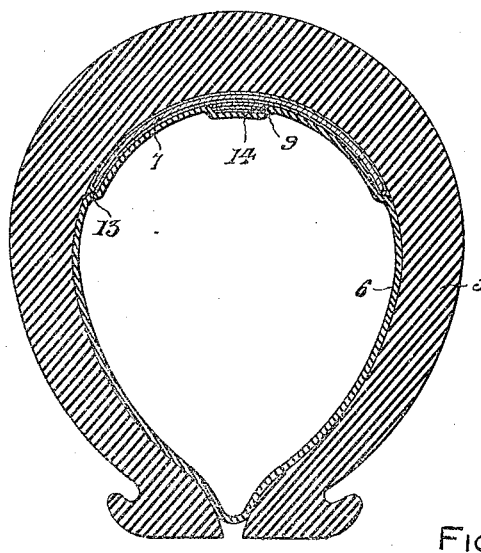
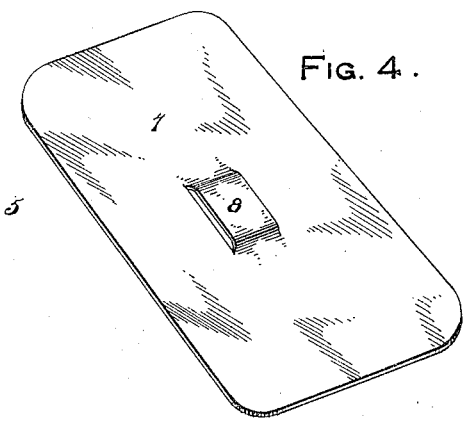
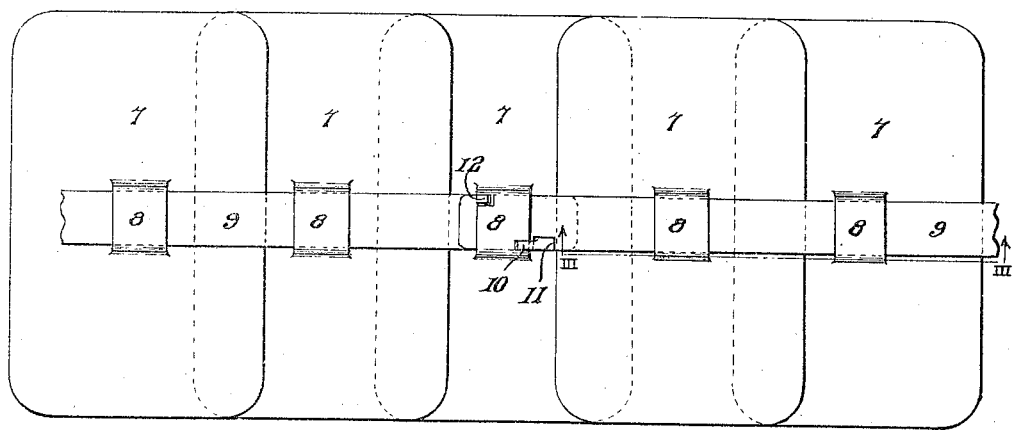
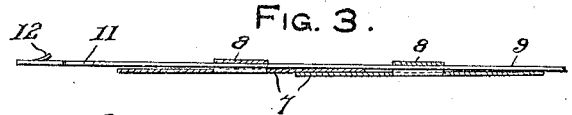
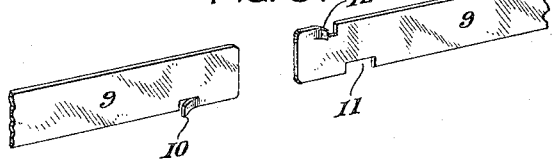
Inventor
P. Evancho
By  J. K. Bryant.
Attorney

UNITED STATES PATENT OFFICE.

PETER EVANCHO, OF ONEIDA, PENNSYLVANIA.

PNEUMATIC-TIRE PROTECTOR.

1,383,612.  Specification of Letters Patent.  Patented July 5, 1921.

Application filed December 16, 1920. Serial No. 431,293.

*To all whom it may concern:*

Be it known that I, PETER EVANCHO, a citizen of Ukraine, residing at Oneida, in the county of Schuylkill and State of Pennsylvania, have invented certain new and useful Improvements in Pneumatic-Tire Protectors, of which the following is a specification.

This invention relates to certain new and useful improvements in pneumatic tire protectors and has particular reference to protectors of the type known as internal armors and comprising a substantially puncture-proof band adapted to be positioned within a tire shoe between the tread portion of the same and the adjacent portion of the inner tube.

The principal object of this invention is to provide a tire protector of this specific kind which may be easily and cheaply manufactured and which shall be extremely efficient and durable.

Broadly, the invention resides in a tire protecting band composed of a plurality of overlapping leaves or plates stamped from sheet metal so as to provide central loops having a securing strip threaded therethrough for holding the plates in their proper relation, the ends of the strip being fastened together in a novel manner for this purpose.

Other objects will appear as the nature of the invention is better understood, and the same consists in the novel form, combination and arrangement of parts hereinafter more fully described shown in the accompanying drawing and claimed.

In the drawing, wherein like reference characters indicate corresponding parts throughout the several views, Figure 1 is a theoretical transverse sectional view of a pneumatic tire equipped with a protector constructed in accordance with the present invention, Fig. 2 is a fragmentary plan view of the protector shown in Fig. 1 but modified by not having parts thereof covered, Fig. 3 is a circumferential sectional view taken substantially upon line III—III of Fig. 2, Fig. 4 is a perspective view of one of the protector band forming plates, and Fig. 5 is a perspective view showing the adjacent ends of the securing strip for the plates.

Referring more in detail to the several views, the present invention contemplates the provision of an extremely simple protecting band adapted to be arranged between the tread portions of the usual form of tire shoe 5 and its inner pneumatic tube 6. This band is preferably formed by arranging a plurality of substantially rectangular plates 7 end to end and in overlapping relation as shown in Fig. 2, each plate being stamped from sheet metal and transversely slitted whereby a central loop member 8 is depressed laterally therefrom. A suitable securing strip 9, preferably of sheet metal is passed through the loops 8 so as to hold the plate 7 in assembled relation for forming an annular protector as will be readily understood, and one end of the strip 9 has a backwardly extending lug 10 stamped therefrom arranged to engage a loop 8 of one of the plates 7 as shown in Fig. 2 for preventing said end from being pulled out of said loop. The other end of the strip 9 is provided with a side notch 11 through which the lug 10 extends and such notch is needed because the first namd end of the strip 9 is overlapped upon the other end thereof. The end of the strip 9 which is provided with the notch 11 is also provided with a struck out lug 12 similar to the lug 10 but upon the opposite edge of the strip 9 arranged to engage the opposite edge of the loop 8 from that engaged by the lug 10. The ends of the strip 9 are thus held against pulling out of the loop 8 through which they extend and the protector is thus effectively held in operative condition by simple means.

If the tire protector is put to such extensive use as to cause excessive heating of the metallic members 7 and 9, these members may be covered with heat insulating material as shown in Fig. 1 wherein an envelop 13 of asbestos or the like is provided for each plate 7, while a similar envelop 14 is provided for the fastening strip 9.

From the foregoing description it will be seen that I have provided an inner tube protector which is of such extremely simple but durable and efficient form as to meet with all the requirements for a successful commercial use, and the manner of using the same will be readily apparent to those skilled in the art.

Minor changes may be made without departing from the spirit and scope of the invention as claimed.

What is claimed as new is:—

An internal armor for pneumatic tires comprising a band formed of a plurality of overlapping plates having transverse loops, and a securing strip threaded through said loops for retaining the plates in operative relation, the ends of said strip being overlapped and provided with struck-up rearwardly directed edge lugs engaging opposite edges of one of said loops whereby the ends of the strip are held against relative expanding displacement, one end of said strip being provided with an edge notch through which the lug of the other end of the strip projects.

In testimony whereof I affix my signature.

PETER EVANCHO.